United States Patent [19]

Reinl et al.

[11] Patent Number: 5,620,736
[45] Date of Patent: Apr. 15, 1997

[54] PREPARATION OF COOLED, SPREADABLE FOAMED MEAT MOUSSE

[75] Inventors: Hubert Reinl, Tuessling; Stefan Klaus, Rielasingen-Worblingen; Anita Pecher, Kastl, all of Germany

[73] Assignee: Nestec S.A., Vevey, Switzerland

[21] Appl. No.: 302,928

[22] PCT Filed: Sep. 17, 1993

[86] PCT No.: PCT/CH93/00226

§ 371 Date: May 27, 1994

§ 102(e) Date: May 27, 1994

[87] PCT Pub. No.: WO94/07380

PCT Pub. Date: Apr. 14, 1994

[30] Foreign Application Priority Data

Sep. 28, 1992 [EP] European Pat. Off. ............. 92116519

[51] Int. Cl.$^6$ ............................................ A23L 1/317
[52] U.S. Cl. ................. 426/641; 426/643; 426/644; 426/646
[58] Field of Search .................. 426/641, 646, 426/519, 521, 643, 644, 589, 520

[56] References Cited

U.S. PATENT DOCUMENTS

| | | | |
|---|---|---|---|
| 4,215,153 | 7/1980 | Kai et al. | 426/643 |
| 4,244,982 | 1/1981 | Menzi et al. | 426/520 X |
| 4,560,570 | 12/1985 | Rausing et al. | 426/646 X |
| 4,820,529 | 4/1989 | Uchida et al. | 426/643 X |
| 5,238,701 | 8/1993 | DuBanchet | 426/646 X |

FOREIGN PATENT DOCUMENTS 3446829 7/1986 Germany.

OTHER PUBLICATIONS

Translation of Risken, German Patent Applicatio No. 34 46 829A1 (1986).

*Primary Examiner*—Arthur L. Corbin
*Attorney, Agent, or Firm*—Vogt & O'Donnell, LLP

[57] ABSTRACT

A meat mousse composition, which when refrigerated is spreadable, includes an admixture of meat particles and a fat, has a dry matter content of from 35% to 50%, a pH of 5 to 6 and a water activity value of 0.960 to 0.980 and based on volume, contains between 20% and 43% of nitrogen or air. To prepare the composition, a meat mousse base is prepared by heating size-reduced meat at a temperature of from 80° C. to 100° C. and under pH conditions which avoid growth of toxic spore-formers and is used to prepare a meat mousse which, by weight, includes from 20% to 50% of the mousse base meat and from 15% to 35% added fat so that the mixture has a dry matter content of from 35% to 50% and a pH of from 5 to 6. The meat mousse is pasteurized, homogenized and cooled to a temperature to obtain a cooled mousse suitable for foaming, the cooled mousse is foamed with nitrogen or air to increase the volume of the cooled mousse by from 25% to 75% and then, the foamed mousse is cooled to set the foamed mousse.

10 Claims, 1 Drawing Sheet

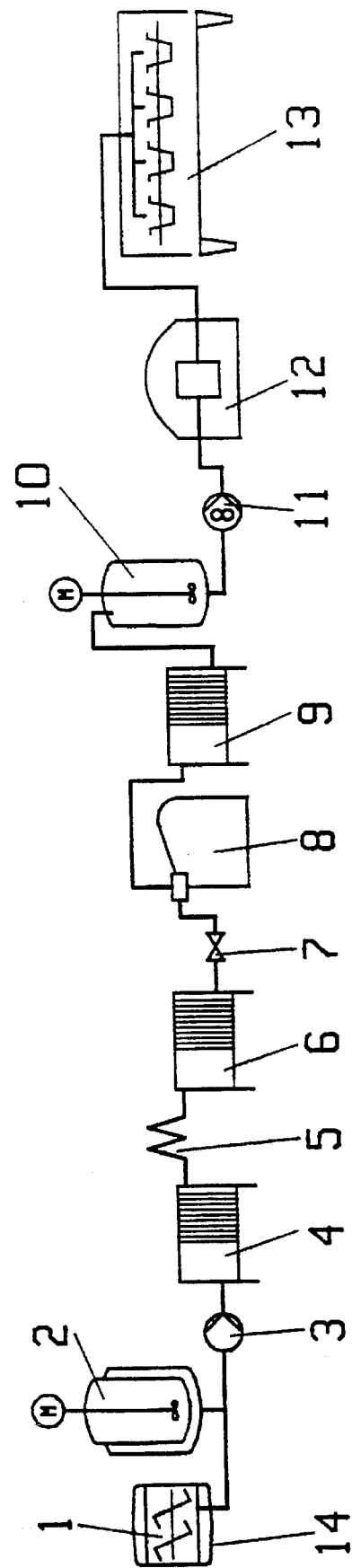
FIG.

PREPARATION OF COOLED, SPREADABLE FOAMED MEAT MOUSSE

BACKGROUND OF THE INVENTION

This invention relates to a cooled, pasteurized spreadable mousse and to a process for its production.

It is known how to produce dessert mousses. However, these neutral mousses are sterilized but are not stabilized by other internal factors. If meat mousse is produced and sterilized, the problem arises that a sandy feeling is experienced on consumption of the product obtained. Such an organoleptic disadvantage is definitely not acceptable to the consumer.

SUMMARY OF THE INVENTION

The problem addressed by the present invention was to provide an organoleptically acceptable meat mousse which would also be spreadable. Since the mousse according to the invention is only pasteurized, it presupposes certain features so far as its composition and the process conditions are concerned.

The invention provides a cooled, pasteurized spreadable mousse which has a pH value of 5 to 6, a water activity ("$a_w$") value of 0.960 to 0.980 and a dry matter ("DM") content of 35 to 50% and which, based on volume, contains between 20 and 43% of nitrogen or air.

The present invention also provides a process for the production of a foamed meat mousse wherein a size-reduced meat is heated, a fat is added and mixed with the size-reduced meat which was heated to obtain a meat mousse, the meat mousse is pasteurized, homogenized, cooled, foamed with nitrogen or air to obtain the foamed mousse, and the foamed mousse is packed subsequently in containers.

DETAILED DESCRIPTION OF THE INVENTION

In accordance with the present invention, by mousse is meant both a fish mousse and a meat mousse. By fish is meant fish per se or crustaceans.

By meat is meant meat of both animals and poultry. A mousse of ham or liver is preferred. By liver is meant goose liver, duck liver, calf liver or pig liver.

Since the mousse according to the invention is pasteurized, spore formers are not completely destroyed so that the pH of the mousse has to be adjusted to a value of 5 to 6. This is done by the addition of an acid, such as citric acid or lactic acid. The mousse preferably has a pH of from 5.4 to 5.7.

The $a_w$ value is defined as the ratio of the water vapour pressure over the food (p) to the water vapour pressure of pure water (po) at the same temperature. Pure water has an $a_w$ value of 1.0. Any addition of a water-binding agent has the effect that p<po so that the $a_w$ value falls below 1. The optimum $a_w$ value of most microorganisms is >0.98. As the $a_w$ value falls, the growth of microorganisms is increasingly inhibited. Determination of the $a_w$ value is based on the principle of freezing point reduction.

The dry matter content is between 35 and 50%. This value is critical from the microbiological and texture points of view. Preferably, the mousse has a dry matter content of from 40% to 45%.

The nitrogen or air content (based on volume) is between 20 and 43% so that a feeling of a light, frothy product is experienced on consumption.

The nitrogen or air content is determined as follows:
- determination of the volume of the end product (V1)
- destruction of the mousse structure, for example by heating (approx. 50° C.) and stirring,
- determination of the residual volume (without gas) (V2),
- calculation of the gas content:

$$\frac{V1 - V2}{V1} \cdot 100$$

The mousse comprises 20 to 50% meat, 15 to 35% fats and added water. The mousse may additionally contain flavourings, thickeners, glutamate, foam stabilizers and other components.

The mousse can be stored in a refrigerator for at least 5 weeks at around 8° C. and is easy to spread because the proteins do not form a crosslinked coagulate.

By fat is meant both animal fat and vegetable fat, for example from meat or coconut, and liquid fat, such as oil, for example from soya. By protein is meant the proteins essentially present in meat or fish (7% to 15% protein).

In carrying out the process and for preparing a mousse in accordance with the invention, the meat is normally size-reduced in a conventional cutter equipped with a double-jacket heating system. To avoid microbiological growth, nitrite pickling salt ($NaCl+NaNO_2$) is added in a quantity of approximately 1% by weight.

The meat thus prepared may then be mixed with coarsely cut liver and acid to adjust the pH to a value of 5 to 6 so that the growth of toxic spore formers is avoided. Water may also be added at the outset in a quantity of 20 to 25%.

The mixture obtained is then size-reduced again and, finally, is heated with continuous stirring, for example by a double-jacket heating system or by the injection of steam. The heating step is carried out at 80° to 100° C. The heating step is carried out so that a spreadable product can be obtained. The heating step lasts about 2 to 5 minutes. The heat treatment has to be carried out before the remaining constituents of the mousse are added.

After the heating step, the remaining constituents of the mousse are added, namely the fat, the flavourings, the thickeners, glutamate, the foam stabilizers, spices, salt and the like. In the interests of thorough mixing, the system as a whole is restirred.

The product is then heated to 90° to 95° C. and kept at that temperature for 4 to 6 minutes. The object of this heat treatment is to inactivate vegetative germs. It is normally carried out in a heat exchanger. To adjust the pH value, acid is added before pasteurization.

The meat paste is then cooled and homogenized at around 50° C. This treatment has to be applied because the pasteurization has broken the emulsion. The homogenized product then has to be cooled to a temperature of 10° to 18° C. to allow foaming.

The product is then introduced into the foaming machine in which it is foamed with sterile nitrogen or air to achieve an increase in volume of 25 to 75%. The mousse is foamed preferably with nitrogen.

The foamed product is packed in containers at a temperature of around 15° C. to obtain a smooth surface.

The pot-like containers in which the product is packed are sterilized. The packing machine is operated either under ultrahygienic conditions or under aseptic conditions.

To enable it to set, the meat mousse is cool-stored.

The machine used to carry out the process according to the invention has to be sterilized with superheated steam or water immediately before the product is introduced and cleaned on completion of production.

The process may be carried out continuously and also discontinuously. Where the process is carried out discontinuously, intermediate storage tanks have to be provided.

BRIEF DESCRIPTION OF THE DRAWING FIGURE

The invention is described in detail in the following with reference to the accompanying drawing which diagrammatically illustrates the process of the invention and apparatus in which it is carried out.

DETAILED DESCRIPTION OF THE DRAWING FIGURE

Meat, which has optionally been size-reduced, is further sized-reduced in the cutter (1). The cutter has a double jacket heating system (14), the meat being subjected to a heat treatment. After this heat treatment, the other components of the composition are added and mixed together in the cutter (1). From an intermediate storage tank (2), the meat mixture is pumped by the pump (3) into the pasteurization unit. The pasteurization unit consists of several heat exchangers (4,5, 6) and a holding valve (7). The heat exchanger (4) allows the meat mixture to be heated to 95° C. while the heat exchanger (5) enables the temperature to be maintained for 5 minutes. In the heat exchanger (6), the meat mixture is cooled to 50° C.

In the homogenizer (8), the mixture is homogenized at 50 to 100 bar and cooled to 10° C. in the following heat exchanger (9). From the intermediate storage tank (10), the meat mousse is pumped by the pump (11) into the foaming machine (12). After an increase in volume of 40 to 45%, the mousse obtained is delivered to the ultra-hygienic packing machine (13) where it is introduced in measured quantities into pots.

The invention is illustrated by the following Example.

EXAMPLE

A mixture containing 35% shoulder ham and 24% water is prepared. The mixture is size-reduced and 0.20% of acid (lactic acid and citric acid) is added. The mixture is then finely size-reduced and heat treated at 90° C.

The following components are then added: 13% hydrogenated coconut oil, 5% soybean oil, 15% cream, 1% sorbitol and salt, pepper and various flavourings and spices. The meat mixture is then pasteurized for 5 minutes at 95° C., cooled to 50° C., homogenized and cooled to 10° C.

The mixture is foamed under a nitrogen pressure of 6.6 bar, the foaming system operating under a pressure of 2.4 bar. An increase in volume of 42% is obtained in this way. The mousse is packed by machine at a product temperature of 15° C.

The mousse keeps for 5 weeks at 8° C. without any significant change in colour, texture, taste or odour.

Other mousses can be prepared, for example containing 11% pig liver and 20% pork or 14% pig liver, 17% pork and 3% duck liver.

We claim:

1. A process for preparing a meat mousse comprising:

heating a composition comprising a meat, which is size-reduced for preparing a mousse, at a temperature of from 80° C. to 100° C. and under pH conditions for avoiding growth of toxic spore-formers, to obtain a mousse base;

preparing a meat mousse which comprises mixing the mousse base and a fat so that the meat mousse by weight, comprises, from 20% to 50% mousse base meat and from 15% to 35% added fat and has a dry matter content of between 35% to 50% and a pH of from 5 to 6;

pasteurizing the meat mousse;

homogenizing the pasteurized mousse;

cooling the homogenized mousse to a temperature to obtain a cooled mousse suitable for foaming;

foaming the cooled mousse with a gas selected from the group consisting of nitrogen and air to increase the volume of the cooled mousse by an amount of from 25% to 75% to obtain a foamed mousse; and cooling the foamed mousse to set the foamed mousse.

2. A process according to claim 1 wherein the composition is heated for from about 2 minutes to 5 minutes.

3. A process according to claim 1 or 2 wherein the pH of the composition heated is from 5 to 6.

4. A process according to claim 1 or 2 wherein the size-reduced meat is further size-reduced during the heating.

5. A process according to claim 1 wherein the composition comprises added water.

6. A process according to claim 1 wherein the meat mousse is pasteurized at a temperature of from 90° C. to 95° C. for from 4 minutes to 6 minutes.

7. A process according to claim 1 wherein the homogenized mousse is cooled to and foamed at a temperature of from 10° C. and 18° C.

8. A process according to claim 1 wherein the composition further comprises liver particles.

9. A process according to claim 1 or 2 wherein the gas is sterile and further comprising, prior to cooling the foamed mousse to set the foamed mousse, packaging the foamed mousse under aseptic conditions.

10. A process according to claim 1 or 2 wherein the gas is sterile and further comprising, prior to cooling the foamed mousse to set the foamed mousse, packaging the foamed mousse under ultra-hygienic conditions.

* * * * *